United States Patent
Okamoto et al.

(10) Patent No.: US 7,165,784 B2
(45) Date of Patent: Jan. 23, 2007

(54) CURRENT SUPPLYING CIRCUIT

(75) Inventors: Mitsuyasu Okamoto, Himeji (JP); Shingo Oda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 155 days.

(21) Appl. No.: 10/357,397

(22) Filed: Feb. 4, 2003

(65) Prior Publication Data

US 2004/0041552 A1    Mar. 4, 2004

Related U.S. Application Data

(60) Provisional application No. 60/359,982, filed on Feb. 28, 2002.

(30) Foreign Application Priority Data

Feb. 4, 2002    (JP) .............................. 2002-026776

(51) Int. Cl.
B60R 21/16    (2006.01)
(52) U.S. Cl. ..................................... 280/735
(58) Field of Classification Search ................. 280/735
See application file for complete search history.

(56) References Cited

U.S. PATENT DOCUMENTS

| | | | | |
|---|---|---|---|---|
| 4,708,060 A * | 11/1987 | Bickes et al. | ............. | 102/202.7 |
| 5,732,634 A | 3/1998 | Flickinger et al. | | |
| 6,072,246 A * | 6/2000 | Schafer | ..................... | 307/10.1 |
| 6,279,479 B1 | 8/2001 | Hermann | | |
| 6,803,544 B1 * | 10/2004 | Zikes et al. | .................. | 219/263 |
| 2004/0095024 A1 * | 5/2004 | Okamoto et al. | ........... | 307/100 |

FOREIGN PATENT DOCUMENTS

| | | |
|---|---|---|
| JP | 8-188114 A | 7/1996 |
| JP | 9-164904 A | 6/1997 |
| JP | 11-48908 A | 2/1999 |
| JP | 11-310102 A | 11/1999 |
| JP | 2001-130366 A | 5/2001 |
| WO | WO 98/10236 A1 | 3/1998 |
| WO | WO 99/24293 A1 | 5/1999 |

* cited by examiner

Primary Examiner—Paul N. Dickson
Assistant Examiner—Joselynn Y. Sliteris
(74) Attorney, Agent, or Firm—Birch, Stewart, Kolasch and Birch, LLP

(57) ABSTRACT

The present invention provides a current supplying circuit in which the weight of an air bag system is reduced.

A current supplying circuit supplying a current required for actuating an electric igniter arranged in a gas generator at a time of actuation of the gas generator for an air bag, and comprising a switch circuit for opening or closing a current path for actuating the igniter, a pulse generator for providing a controlling pulse for opening or closing the switch circuit, and the switch circuit provided between the current path and an external power source, wherein.

a current obtained from the external power source is supplied as an ignition pulse for actuating the igniter by the switch circuit, and the current is further adjusted such that the width of the ignition pulse is 20 to 500 μsec to be supplied.

11 Claims, 7 Drawing Sheets

US 7,165,784 B2

CURRENT SUPPLYING CIRCUIT

This nonprovisional application claims priority under 35 U.S.C. § 119(e) on U.S. Provisional application No. 60/359,982 filed on Feb. 28, 2002 and under 35 U.S.C. § 119(a) on Patent Application No. 2002-26776 filed in Japan on Feb. 4, 2002, which are herein incorporated by reference.

BACKGROUND OF THE INVENTION

1. Field of the Invention

The present invention relates to a current supplying circuit which supplies an electric current for actuating an igniter at a time of actuation of an air bag gas generator, an air bag system using the current supplying circuit and a method of actuating an igniter.

2. Description of Related Art

An air bag system for protecting a passenger from an impact at a time of collision of a vehicle is indispensable, and the air bag system needs to be reduced in weight from a demand for reducing weight of an entire vehicle. Recently, kinds and the total number of air bags such as an air bag for a driver side, an air bag for a passenger side next to the driver, an air bag for a rear seat side, and an air bag for a side impact are increasing, and therefore, a lighter air bag system is in greater demand.

In a current air bag system, an electronic control unit (ECU) connected to a power source (a battery installed in a vehicle) and an impact detecting sensor are individually connected to individual gas generators (a gas generator and an air bag are accommodated in a module case). An aspect of the connection between the ECU and the individual gas generators is shown in FIG. 4.

As shown in FIG. 4, the ECU and each module case are connected to each other through two conducting wires (lead wires), and an electric current at a time of actuation of an igniter is supplied from a battery. When any one of the lead wires connecting the battery and the ECU at a time of vehicle collision is broken, a gas generator is not actuated. In order to avoid such a situation, a capacitor for backup power source is incorporated into the ECU. However, this capacitor has to actuate all igniters, and therefore, the capacitor is obligated to have a large capacitance (namely, weight), which makes the ECU so large.

SUMMARY OF THE INVENTION

An object of the present invention is to provide a current supplying circuit in which a capacitance of a capacitor for backup power source provided in an ECU is reduced and that contributes to weight reduction of an entire air bag system, an air bag system using the current supplying circuit, and a method for actuating an igniter.

In order to reduce a total amount of an electric current stored in the capacitor, which is an essential condition to reduce a capacitance of the capacitor for backup power source provided in an ECU, the present inventors started studying in view of reducing an amount of ignition energy required for actuating individual igniters.

In order to inflate an air bag within a required period at a time of vehicle collision, a heat generating portion of the igniter has to generate heat instantaneously to securely ignite and burn a priming in contact with the heat generating portion. Considering an ignition energy (μJ) required for heat generation at the heat generating portion, the inventors repeatedly made a study about a relationship between a pulse width (μsec) of the current supplied to the heat generating portion and an amount of ignition energy. As a result, the inventors found that the priming can be ignited and burnt with ignition energy of about 1000 μJ, provided that the resistance value of the heat generating portion is 2Ω and the priming is a mixture (ZPP) of zirconium and potassium perchlorate, or a mixture of another priming such as hafnium hydride or titanium hydride and potassium perchlorate. They further found the range of pulse width of the current imparting the ignition energy, and completed the present invention.

The present invention provides, as one means for solving the above problem, a current supplying circuit which supplies an electric current required to actuate an electric igniter arranged in a gas generator at a time of actuation of the air bag gas generator, wherein a current obtained from an external power source is supplied as an ignition pulse for actuating the igniter, and the current is supplied such that the width of the ignition pulse becomes 20 to 500 μsec.

In a conventional air bag system, since the electric current for actuating an igniter flows from a power source (i.e., a battery) at 1.2 A for about 2 msec, that is, at a relatively low current for a relatively long period of time, the waveform (ignition pulse) of the ignition current (a vertical axis denotes a current value (A) and a horizontal axis denotes a time (μsec)) becomes rectangular.

Therefore, in this invention, a current is supplied at a relatively high current value for a short period of time, such that the width of the ignition pulse at this time is 20 to 500 μsec, preferably 30 to 200 μsec, and more preferably 40 to 100 μsec. As a result, since the amount of ignition energy required for actuating individual igniters can be reduced, the amount of ignition energy required for all the igniters, namely, for the entire air bag system can be reduced. For this reason, a capacitance of a capacitor for backup power source, incorporated into the ECU, can be made smaller and therefore, the ECU itself can also be made compact.

The present invention provides, as another means for solving the above problem, a current supplying circuit for supplying an electric current required for actuating an electric igniter arranged in a gas generator at a time of actuation of the gas generator for an air bag, comprising, a switch circuit for opening or closing a current path for actuating the igniter, a pulse generator for providing a controlling pulse for opening or closing the switch circuit, and the switch circuit provided between the current path and an external power source, wherein an electric current obtained from the external power source is supplied as an ignition pulse for actuating the igniter by the switch circuit, and the current is further adjusted such that the width of the ignition pulse is 20 to 500 μsec to be supplied.

In the above invention, a failure detecting circuit for detecting a disconnection of the current path may be further provided, and a switch circuit may not be provided between the current path and the failure detecting circuit.

In the above invention, a voltage transformer and a capacitor which stores a current supplied from the external power source to supply a current instead of the external power source when supplying a current from the external power source is interrupted may be further provided. The voltage transformer is for conducting voltage transform for an interface or an MCU (Micro Computer Unit).

As the switch circuit, a thyristor, a MOS-FET or a bipolar transistor or the like can be used, and the switch circuit can be provided at both or one of a positive and negative sides of the path supplying the current.

In the current supplying circuit of the above invention, a current obtained from the external power source is supplied as an ignition pulse for actuating the igniter, and the current is supplied such that the width of the ignition pulse is 20 to 500 μsec, preferably 30 to 200 μsec, and more preferably 40 to 100 μsec.

By using an ignition pulse having such a specific width, an amount of current (an amount of ignition energy) required for actuating individual igniters can be reduced, so that an amount of current required for all igniters, namely for the entire air bag system, can be reduced. For this reason, a volume of a capacitor for backup power source incorporated into the ECU can be made smaller and therefore the ECU itself can also be made compact.

Further, the present invention provides, as another means for solving the above problem, an air bag system comprising, an ECU connected to a power source and an impact detecting sensor, and a plurality of module cases connected to the ECU and accommodating a plurality of gas generators and a plurality of air bags, each of the ECU and individual gas generators being connected separately by conductors, wherein the current supplying circuit is provided in the ECU.

Furthermore, the present invention provides, as another means for solving the above problem, a method of actuating an electric igniter in which the igniter is arranged in a gas generator for an air bag adapted to be actuated by supplying a current, wherein a current obtained from an external power source is supplied as an ignition pulse for actuating the igniter and the current is supplied such that the width of the ignition pulse is 20 to 500 μsec.

In the above invention, it is preferable to supply a current, in view of reducing an amount of current, such that the width of the ignition pulse is 40 to 100 μsec.

By using the current supplying circuit of the present invention, the weight of the entire air bag system mounted on a vehicle can be reduced while securing operation performance similar to that in the conventional one.

DETAILED DESCRIPTION OF THE INVENTION

First Embodiment

Figure 1:
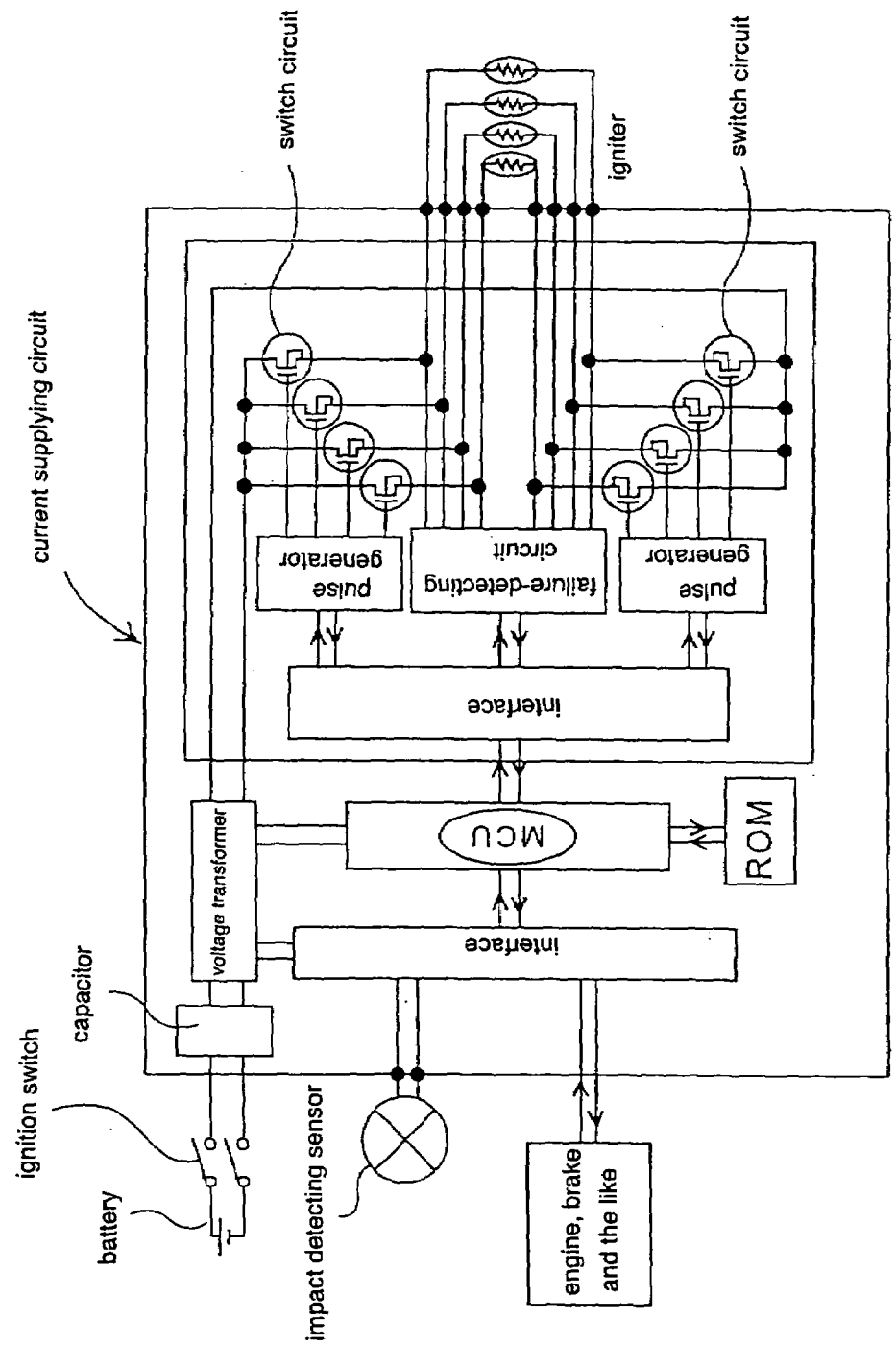
FIG. 1 is a conceptual diagram of a current supplying circuit.

An embodiment of the present invention will be explained below with reference to the drawings. FIG. 1 is a conceptual diagram of a current supplying circuit of the present invention. The current supplying circuit is provided in an ECU.

A current supplying circuit is constituted by arranging respective elements of at least a switch circuit, a pulse generator, a failure detecting circuit, a voltage transformer, a capacitor and the like on a substrate, and it is provided in a midway of a current path connecting a battery which is an external power source and igniters incorporated into gas generators. Two current paths are provided for each igniter and formed by two conducting wires (lead wires).

The switch circuit, which opens or closes the current path to block a current when it is unnecessary to actuate an igniter and to supply a current at a time of actuation of the igniter, is provided in the current supplying circuit, and one switch circuit is provided for each current path (for each one lead wire). When the switch circuit is opened, a current never flows into the current path.

The switch circuit and the pulse generator are connected by conductors, and the switch circuit is opened or closed by sending a controlling pulse instructing to open or close the switch circuit from the pulse generator. A command for transmitting a controlling pulse to the pulse generator is sent from an MCU upon receipt of an instruction from an impact detecting sensor.

The switch circuit is formed of a thyristor, a MOS-FET, a bipolar transistor or the like. It is desirable, in view of preventing an erroneous operation, that the switch circuits is provided on each of positive and negative sides of the current path, as shown in FIG. 1, but it may be provided on only the positive side. For example, when that a current pulse with a waveform width of 100 μsec is applied from the pulse generator, the switch is closed for 100 μsec so that a current from the voltage transformer flows to a heat generating portion of the igniter as a pulse with a width of 100 μsec. By applying a pulse with a predetermined time-width to the heat generating portion of the igniter in this manner, heat is generated at the heat generating portion to ignite and burn a priming.

The failure detecting circuit is for detecting abnormality of an igniter (abnormality of the heat generating portion of the igniter), and it is connected with the current path, but a switch circuit is not provided between the failure detecting circuit and the current path. For this reason, when the igniter is not being actuated (when a vehicle is running normally), a weak electric current for detecting disconnection is always flowing from the failure detecting circuit, so that abnormality of the igniter can be detected promptly and such abnormality is notified by an alarm lamp actuated in a linkage manner, which allows early exchange of parts.

The capacitor is for storing a current supplied from the battery and supplying an electric current instead of the battery when supplying the current from the battery is interrupted. Therefore, the capacitor is connected to all elements within the current supplying circuit directly or indirectly through conductors. The capacitor is provided in a midway of the current path from the battery to the current supplying circuit, but a current is sent to the current supplying circuit by only the battery unless a disconnection occurs between the battery and the ECU.

The voltage transformer is for performing voltage transformation for an interface or an MCU, a ROM is for storing patterns of signals required for actuating each air bag system, and the interface is for optimizing external signals in order to transmit them to the MCU, the pulse generator, and the failure detecting circuit.

Next, operation of the current supplying circuit will be explained. When a vehicle is running normally, a capacitor stores therein a current required as a backup power source of a current supplied from the battery. Then, a test current (weak current) for detecting disconnection flows from the failure detecting circuit, so that abnormality of the igniter (a loose contact between the heat generating portion and the priming of the igniter, or a disconnection of the heat generating portion) is detected.

As one of conditions required for the gas generator to activate normally, a contacting state between the heat generating portion of the igniter and the priming has to be good (the heat generating portion and the priming has to be brought in press-contact with each other). For example, when there is a gap between the heat generating portion and the priming, it is considered that there occurs a malfunction such that the priming is not ignited when the igniter is actuated or an ignition is delayed. Further, when the heat generating portion is disconnected or have been half-disconnected, a similar malfunction occurs. For this reason, by recording information for detecting the malfunction in the integrated circuit, an inferior product can be removed at a time of shipping, and by detecting abnormality at a practical use (while driving a vehicle), a prompt exchange can be performed.

When a vehicle collides, an instruction from the impact detecting sensor is transmitted to the ECU, and an instruction for closing the switch circuit is transmitted to the pulse generator via the MCU. When transmission of the instruction is received, a current from the battery is sent to the igniter via the current path as an ignition pulse for actuating the igniter (the width is 20 to 500 μsec, preferably 30 to 200 μsec and more preferably 40 to 100 μsec) while a controlling pulse is flowing into the switch circuit from the pulse generator. Upon receipt of the ignition pulse, the heat generating portion of the igniter generates heat, so that the priming in contact with the heat generating portion is ignited.

Next, a relationship between the ignition pulse width (μsec) and a minimum ignition energy (μJ) required to activate the igniter when the current supplying circuit was used will be explained with Experimental Examples.

Experimental Example 1

Figure 7:
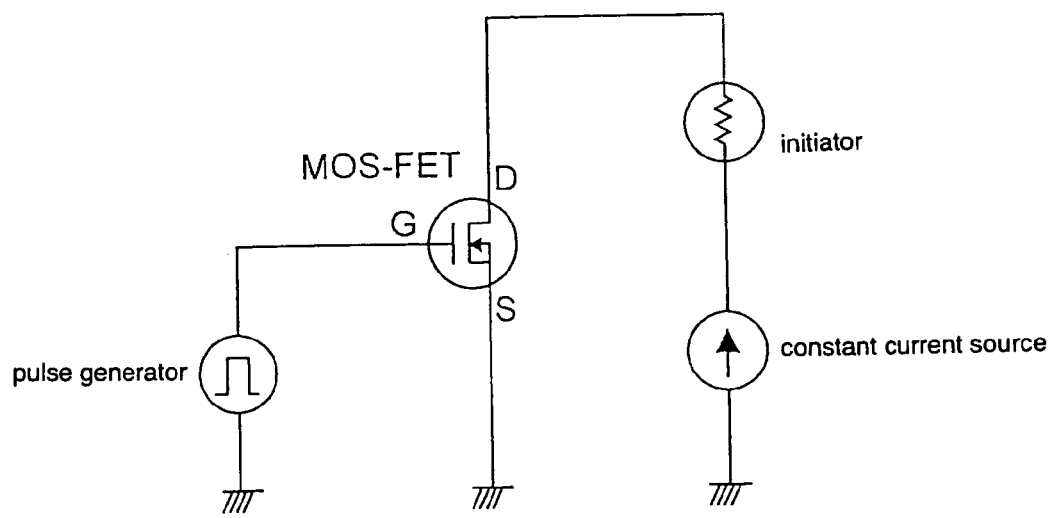
FIG. 7 is a conceptual diagram of a test circuit used in Experimental Example 1.

A test circuit shown in FIG. 7 was used as the current supplying circuit, and it was recorded such that each switch circuit was supplied with currents supplied from the power source, being adjusted to have ignition pulses with widths of 15 μsec, 40 μsec, 100 μsec and 2000 μsec.

Figure 3:
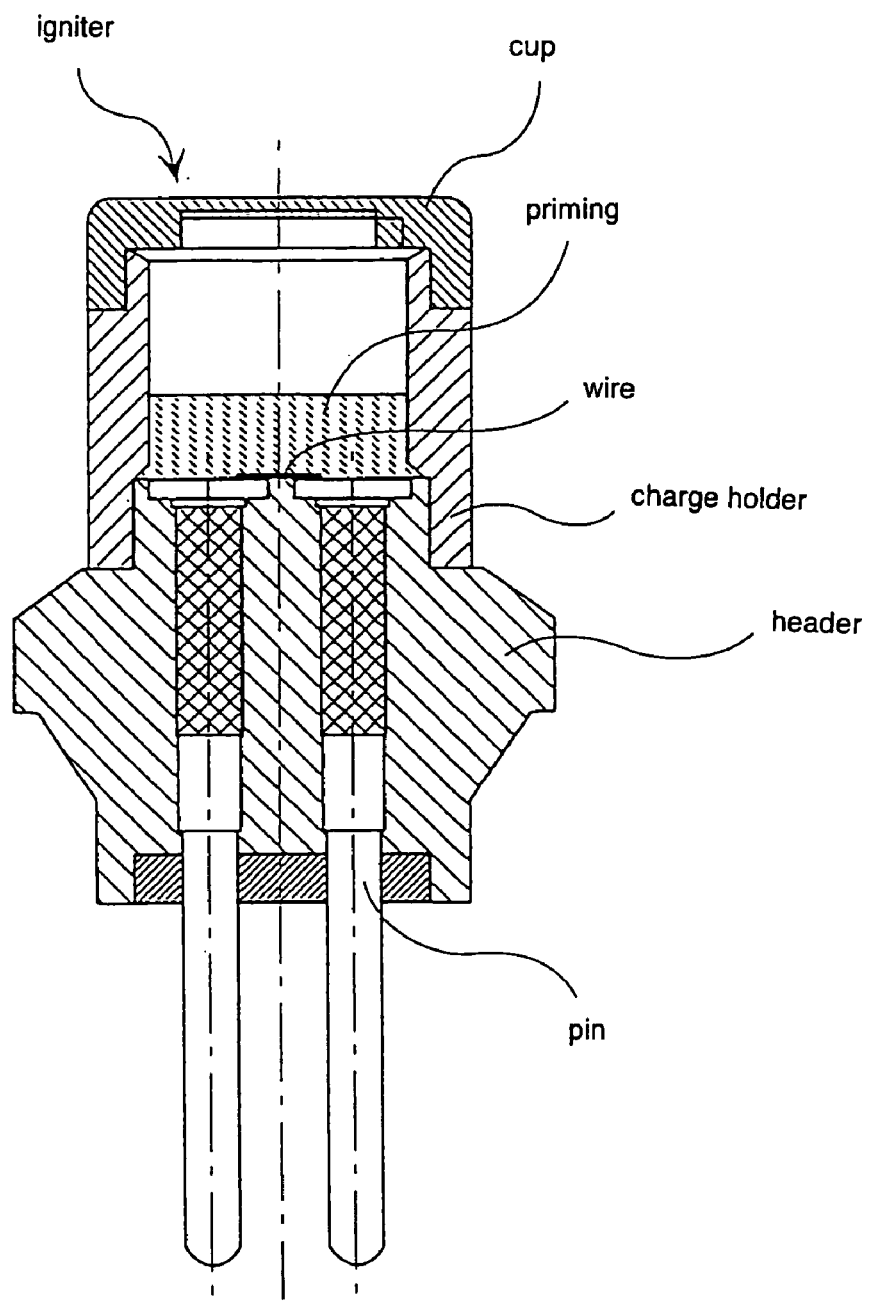
FIG. 3 is a vertical sectional view of an igniter.

A general igniter shown in FIG. 3 was used as the igniter. In the igniter, the heat generating portion was constituted by connecting a metal thin wire, which is a resistance heat generating body (resistance=2Ω), between electrodes by a resistance-welding, ZPP of 60 mg was used as the priming, and the heat generating portion and ZPP were maintained in a cup such that they were press-contacted with each other. The igniter was connected to conducting wires at two pin portions, and it was connected to a constant-current source via the current supplying circuit shown in FIG. 7.

Under these experimental conditions, the combustion state of the priming when a current was supplied from the constant-current source to supply a predetermined width of ignition pulses (μsec) was observed. The measurement results are shown in FIG. 2.

Figure 2:
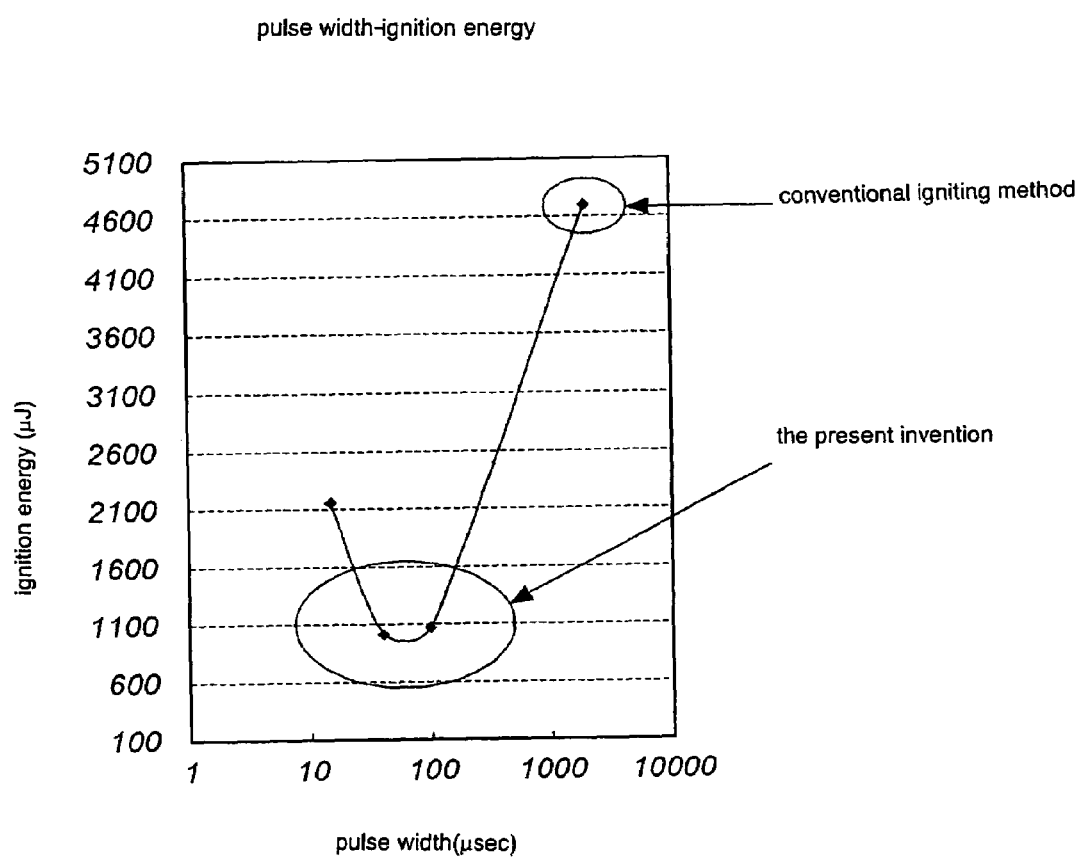
FIG. 2 is a graph showing an advantage of the current supplying circuit.

FIG. 2 shows a relationship between a pulse width (μsec) of an ignition pulse and a minimum ignition energy (μJ), and respective points are 15 μsec, 40 μsec, 100 μsec, and 2000 μsec in an ascending order. Incidentally, ignition energy can be obtained from the following formula: $E=I^2Rt$ (I denotes a current (A) (an ignition current having a reliability of 99.9999%), R denotes a resistance (Ω), t denotes a pulse width (μsec)). In case that R(Ω) was made constant and the pulse width (t) was set to 15 μsec, 40 μsec, 100 μsec, and 2000 μsec, test was repeated about whether or not the priming was normally actuated when the current (I) was changed, so that the minimum ignition energy (E) was obtained when the priming was normally ignited.

The minimum ignition energies at all the pulse widths of 15 μsec, 40 μsec, 100 μsec, and 2000 μsec are shown in FIG. 2, from which it was confirmed that the priming could sufficiently be ignited and burnt even in a pulse width in the range of 40 to 100 μsec, which corresponded to the ignition energy of about 1000 μJ. The minimum ignition energy obtained in the pulse width in the range of 40 to 100 μsec was reduced to ⅕ of the ignition energy obtained at the conventional pulse width of 2000 μsec (2 msec).

By setting the ignition pulse width to a predetermined range with such a current supplying circuit, an amount of a current (an amount of ignition energy) required for actuating individual igniters normally can be reduced, so that an amount of current (an amount of ignition energy) required for actuating all the igniters normally can also be reduced. As a result, the capacitance (namely weight) of the capacitor for a backup power source can also be made smaller and the ECU itself can be made compact.

The current supplying circuit of the present invention can be applied to various inflators (gas generators) such as an inflator for an air bag for a driver side, an inflator for an air bag for a passenger side next to the driver, an inflator for a side air bag, an inflator for a curtain air bag, and an inflator for a knee-bolster air bag, an inflator for an inflatable seat belt, an inflator for a tubular system, and an inflator for a pretensioner.

Second Embodiment

Figure 5:
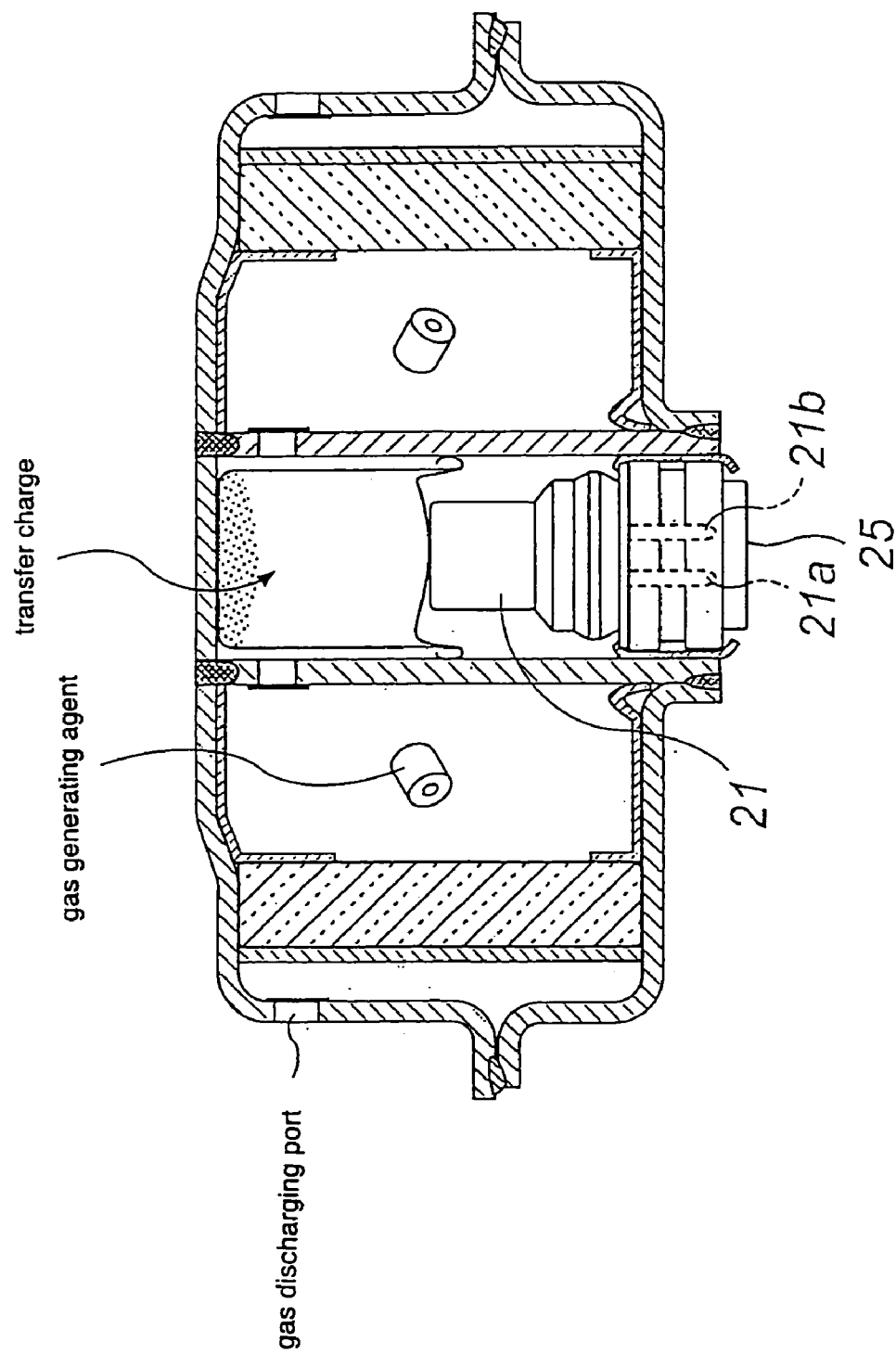
FIG. 5 is a sectional view of a single type gas generator in the radial direction.
Figure 6:
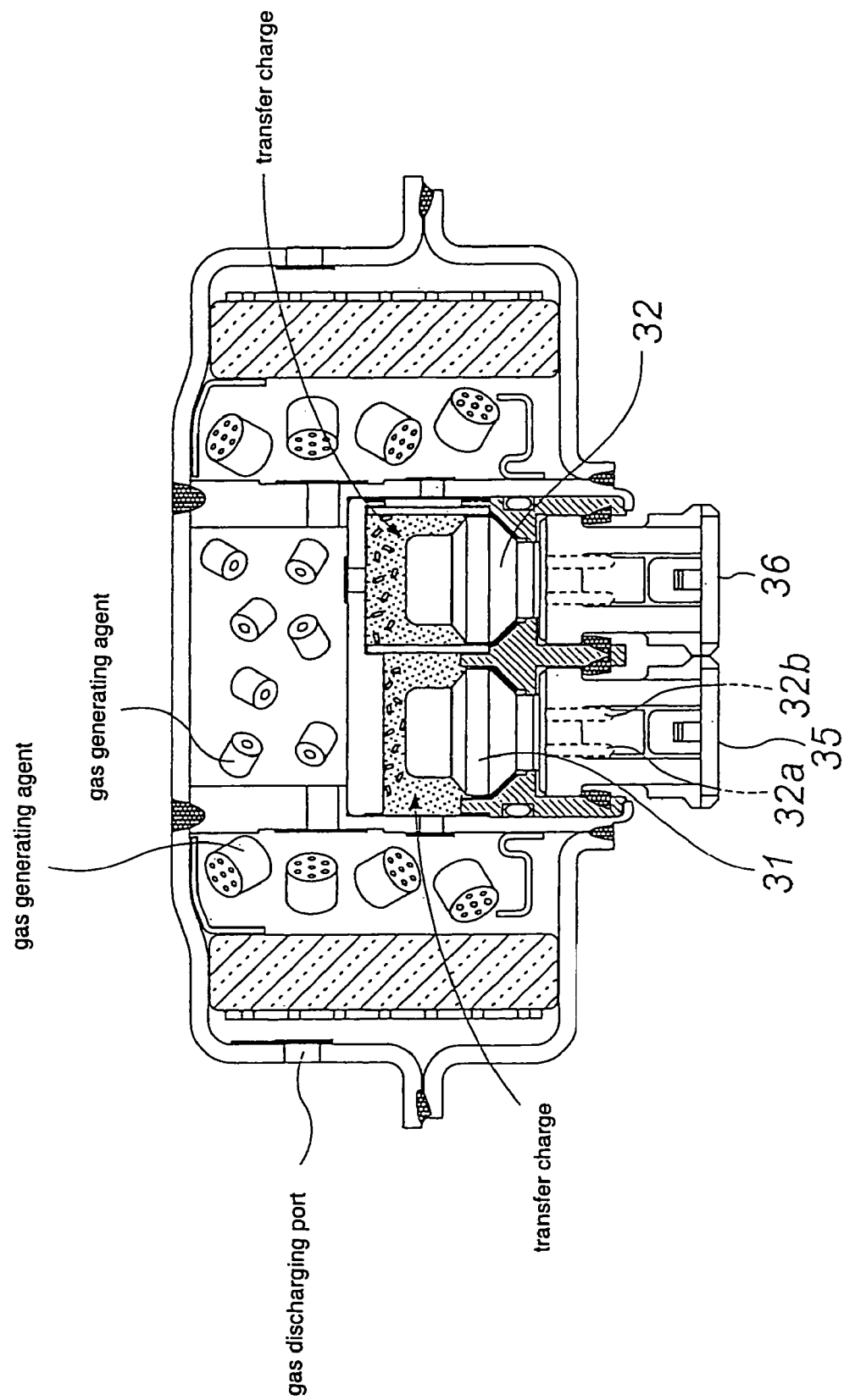
FIG. 6 is a sectional view of a dual type gas generator in the radial direction.

Next, an embodiment of an air bag system of the present invention using the above-described current supplying circuit will be explained with reference to FIG. 1 to FIG. 6. FIG. 5 and FIG. 6 are sectional views of general gas generators in the radial direction, FIG. 5 shows a gas generator of a single type having a single igniter, and FIG. 6 shows a gas generator of a dual type having two igniter.

Figure 4:
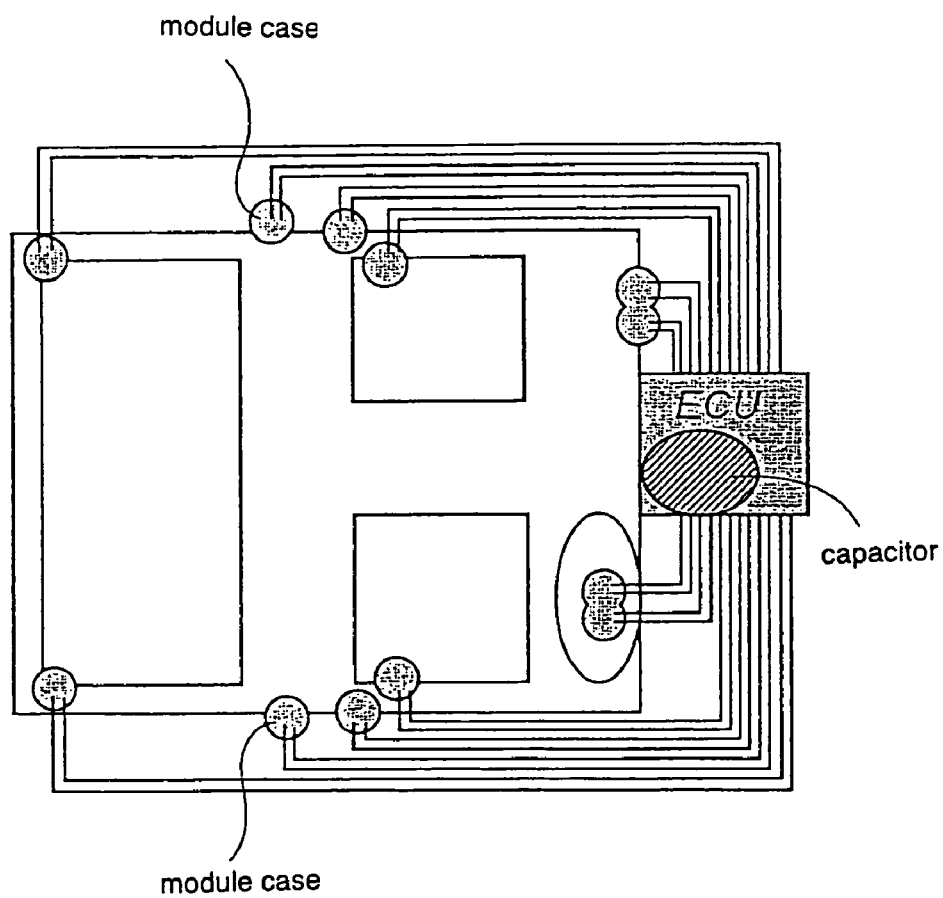
FIG. 4 is a diagram of an air bag system.

As shown in FIG. 4, an air bag system mounted in a vehicle comprises an ECU connected to a power source (a battery) and an impact detecting sensor, and plural module cases accommodating plural gas generators and air bags, which is connected to the ECU, wherein each of the ECU and individual gas generators is connected separately by conductors, and the current supplying circuit as shown in FIG. 1 is provided in the ECU.

As the gas generator accommodated in the module case, one of the single type shown in FIG. 5 or one of the dual type shown in FIG. 6 can be used, and as an igniter incorporated into the gas generator, one shown in FIG. 3 can be used.

In the current supplying circuit shown in FIG. 1, four igniters are shown, where four gas generators of the single type, two gas generators of the dual type, or a combination of gas generators of the single type and the dual type can be used.

Next, an operation of the air bag system of the present embodiment will be explained with reference to FIG. 1 to FIG. 6. When a vehicle is running normally, a weak current for disconnection detecting of the heat generating portion flows to the igniters of the gas generators from the current supplying circuit to detect abnormality in the igniters. If abnormality is detected, the abnormality is announced by an alarm lamp actuated in linkage with the air bag system or the like so that an early exchange of parts can be made and a safety can therefore be ensured. Further, charging of the capacitor in the current supplying circuit from the power source can be made.

When the vehicle mounted with the air bag system collides, information from the impact detecting sensor is transmitted to the current supplying circuit in the ECU, a controlling pulse is transmitted from the pulse generator upon receipt of this information, and the switch circuit is actuated. A current is supplied as an ignition pulse for actuating the igniter due to the actuation of the switch circuit, the width of the ignition pulse is adjusted to 20 to 500 µsec so that minimum required ignition energy is supplied to the heat generating portion of the igniter, and the priming is ignited and burnt.

According to ignition and combustion of the priming, a transfer charge in the gas generator shown in FIG. 5 or FIG. 6, and further the gas generating agent is ignited and burnt to generate a gas. The generated gas is discharged from gas discharging ports to inflate an air bag accommodated in the module case together with the gas generator.

By using such an air bag system, an amount of a current (an amount of ignition energy) required for actuating individual igniters normally is reduced, so that an amount of a current (an amount of ignition energy) required for actuating all the igniters normally can also be reduced. Thereby, the capacitance (weight) of the capacitor for a backup power source can also be made smaller and the ECU itself can be made compact. For this reason, the weight of the entire air bag system can be reduced.

The air bag system of the present invention can be applied to various inflators (gas generators) such as an inflator for an air bag for a driver side, an inflator for an air bag for a passenger side next to the driver, an inflator for a side air bag, an inflator for a curtain air bag, and an inflator for a knee-bolster air bag, an inflator for an inflatable seat belt, an inflator for a tubular system, and an inflator for a pretensioner.

The invention claimed is:

1. A method of determining a width of an ignition pulse to be applied to an igniter, comprising:
    applying the igniter with an electric current having a plurality of predetermined width of pulses;
    obtaining a minimum ignition energy for activating the igniter normally in each of the predetermined width of pulses and a relationship between the predetermined width of pulses and the minimum ignition energy;
    determining a range of the width of the ignition pulses to be applied to the igniter based on the relationship, which includes the width of an ignition pulse corresponding to the lowest of the minimum ignition energy; and
    adjusting the width of the ignition pulse to be applied to the igniter to the determined range of the width of ignition pulses.

2. The method of claim 1, wherein the range of the width of the ignition pulses is 20 to 500 µsec.

3. The method of claim 2, wherein the range of the width of the ignition pulses is 40 to 100 µsec.

4. The method of claim 1, wherein, in said obtaining step, the minimum ignition energy is calculated based on a formula:

$$E = I^2 R t$$

where E is the minimum ignition energy value, I is an electric current to be applied to the igniter, R is a resistance of the igniter, and t is the width of the ignition pulse.

5. The method of claim 1, wherein, said obtaining step includes,
    obtaining the minimum ignition energy for activating the igniter normally in each of the predetermined width of the ignition pulses by changing the electric current and observing an activation of the igniter.

6. The method of claim 1, wherein, said obtaining step includes,
    obtaining the relationship between the predetermined width of pulses and the minimum ignition energy based on a graph on which the minimum ignition energy corresponding to each of the predetermined width of the ignition pulse is plotted.

7. A method of activating an igniter, comprising:
    previously determining a width of an ignition pulse to be applied to the igniter by,
        applying the igniter with an electric current having a plurality of predetermined width of pulses,
        obtaining a minimum ignition energy for activating the igniter normally in each of the predetermined width of pulses and a relationship between the predetermined width of the pulses and the minimum ignition energy;
    determining a range of the width of the ignition pulses to be applied to the igniter based on the relationship, which includes the width of an ignition pulse corresponding to the lowest of the minimum ignition energy; and
    adjusting the width of the ignition pulse to be applied to the igniter to the determined range of the width of the ignition pulses.

8. The method of claim 7, wherein the range of the width of the ignition pulses is 20 to 500 µsec.

9. The method of claim 8, wherein the range of the width of the ignition pulses is 40 to 100 µsec.

10. The method of claim 7, wherein, in said obtaining step, the minimum ignition energy is calculated based on a formula:

$$E = I^2 R t$$

where E is the minimum ignition energy value, I is selected lowest electric current to be applied to the igniter, R is a resistance of the igniter, and t is the width of the ignition pulse.

11. A method of activating a gas generator having an igniter, comprising:
    activating the igniter according to the method recited in claim 7.

* * * * *